US011718132B1

(12) United States Patent
Stewart

(10) Patent No.: US 11,718,132 B1
(45) Date of Patent: Aug. 8, 2023

(54) RETRACTABLE TOW REEL ASSEMBLY

(71) Applicant: Super ATV, LLC, Madison, IN (US)

(72) Inventor: Jason Stewart, Harvest, AL (US)

(73) Assignee: Super ATV, LLC, Madison, IN (US)

( * ) Notice: Subject to any disclaimer, the term of this patent is extended or adjusted under 35 U.S.C. 154(b) by 0 days.

(21) Appl. No.: 18/050,057

(22) Filed: Oct. 27, 2022

(51) Int. Cl.
*B60D 1/18* (2006.01)
(52) U.S. Cl.
CPC ............. *B60D 1/187* (2013.01); *B60D 1/185* (2013.01)
(58) Field of Classification Search
CPC .......... B60D 1/18; B60D 1/185; B60D 1/187
See application file for complete search history.

(56) References Cited

U.S. PATENT DOCUMENTS

| 6,092,826 A * | 7/2000 | Pingel ..................... B60D 1/18 280/480 |
| 7,731,218 B2 | 6/2010 | McGinnia et al. |
| 9,840,183 B2 * | 12/2017 | Tolly ......................... B60P 7/16 |
| 10,723,255 B2 * | 7/2020 | Plahuta ................. B60P 7/0846 |
| 2017/0015162 A1 * | 1/2017 | Walter ..................... B60D 1/46 |

\* cited by examiner

*Primary Examiner* — Sang K Kim
(74) *Attorney, Agent, or Firm* — Woodard, Emhardt, Henry, Reeves & Wagner, LLP

(57) ABSTRACT

A retractable tow reel assembly for an off-road vehicle, the assembly comprising:
  a) a bracket having a pair of opposing uprights and mountable to an off-road vehicle;
  b) a reel adapted to be held by the bracket when mounted to the vehicle and effective for holding a tow rope, the reel including a shaft and a pair of opposing drum ends having a diameter greater than the diameter of the connecting shaft, and
  c) a tow rope having an eye end and a free end, wherein the eye end is threaded around the shaft;
wherein the shaft has a first end and a second end, and wherein the first end of the shaft may be released from the first drum end and exposed to facilitate threading of the rope eye over the shaft without releasing the second end of the shaft from the second drum end.

20 Claims, 4 Drawing Sheets

RETRACTABLE TOW REEL ASSEMBLY

FIELD OF THE INVENTION

The invention relates generally to motor vehicles, and more particularly to a tow reel assembly for use on high-performance off-road vehicles such as ATVs and UTVs.

BACKGROUND

Retractable tow lines are known to be useful for off-road vehicles such as all-terrain vehicles (ATV) and utility task vehicles (UTV). Most commonly, such retractable tow lines comprise a rope wound around and stored on a central reel, which may be put in a free mode to feed line out when needed, or put in a retracting mode to wind-up the rope when desired. The reel typically comprises a central shaft and two opposing drum ends, at least one of which may be biased to wind-up using a torsion spring when the assembly is in its retracting mode.

However, the rope is subject to heavy wear, and when worn out must be replaced. With prior art retractable tow rope assemblies, this has required removing the shaft from the drum ends by punching the shaft out with a punch. This is time consuming and generally cannot be done without tools in the field.

A need therefore exists for a tow line assembly that allows the rope to be changed more quickly and easily. The present invention addresses that need.

SUMMARY OF THE INVENTION

The present invention provides a tow reel assembly for an off-road vehicle, the assembly comprising:
 a) a bracket having a pair of opposing uprights and mountable to an off-road vehicle;
 b) a reel adapted to be held by the bracket when mounted to the vehicle and effective for holding a tow rope, the reel including a shaft and a pair of opposing drum ends having a diameter greater than the diameter of the connecting shaft, wherein the shaft is quickly releasable from at least one of the drum ends in the field without using tools;
 c) a tow rope having an eye end and a free end, wherein the eye end is threaded around the shaft.

In one embodiment the tow reel assembly uses a shaft with a first end and a second end, and the reel is a two-piece reel comprising a first reel portion and a second reel portion. The first reel portion may comprise a first drum end and a first shaft collar adapted to directly or indirectly connect the first shaft end to the first drum end, and the second reel portion may comprise a second drum end and a second shaft collar adapted to directly or indirectly connect the second shaft end to the second drum end. The first shaft collar may comprise an extension tube extending from the first drum end and adapted to receive the first shaft end.

The assembly may include a winding bar to facilitate winding of the rope around the shaft.

The assembly may be a retractable tow reel assembly, and may include a spring assembly to facilitate winding of the rope around the shaft. The spring may be a torsion spring.

The bracket may be a two-piece bracket comprising one of the pair of opposing uprights and a second end portion comprising the other of the pair of opposing uprights, and may be separable into its two pieces in the field without using tools.

In another embodiment the tow reel assembly comprises a bracket having a pair of opposing uprights and mountable to an off-road vehicle, a reel adapted to be held by the bracket when mounted to the vehicle, and a tow rope having an eye end and a free end. The reel may include a shaft and a pair of opposing drum ends having a diameter greater than the diameter of the connecting shaft, and the tow rope eye may be threaded around the shaft. The first end of the shaft may be released from the first drum end and exposed to facilitate threading of the rope eye over the shaft without releasing the second end of the shaft from the second drum end.

In a further embodiment of the present invention there is provided a method for replacing a tow rope on a tow reel. The method may comprise:
 a) providing a tow reel assembly for an off-road vehicle, the assembly comprising:
  i) a bracket having a pair of opposing uprights and mountable to an off-road vehicle;
  ii) a reel adapted to be held by the bracket when mounted to the vehicle and effective for holding a tow rope, the reel including a shaft and a pair of opposing drum ends having a diameter greater than the diameter of the connecting shaft, wherein the shaft is quickly releasable from at least one of the drum ends in the field without using tools; and
  iii) a tow rope having an eye end and a free end, wherein the eye end is threaded around the shaft;
 b) releasing one end of the shaft from the drum end to which it is attached, thus exposing that end of the shaft;
 c) removing the eye end of the tow rope from the shaft by sliding it off of the exposed end of the shaft;
 d) replacing the removed tow rope on the shaft by sliding the eye of a new tow rope over the exposed end of the shaft; and
 e) returning the drum end to the shaft end from which the drum end was removed.

In another aspect of the inventive method the tow reel assembly uses a shaft with a first end and a second end, and the reel is a two-piece reel comprising a first reel portion and a second reel portion. The first reel portion may comprise a first drum end and a first shaft collar adapted to directly or indirectly connect the first shaft end to the first drum end; and the second reel portion may comprise a second drum end and a second shaft collar adapted to directly or indirectly connect the second shaft end to the second drum end. One or both of the shaft collars may comprise an extension tube extending from the first drum end and adapted to receive the first shaft end.

In a further aspect of the inventive method, the tow reel is a retractable tow reel that includes a spring assembly to facilitate winding of the rope around the shaft. In some preferred embodiments the spring is a torsion spring.

In other aspects of the inventive method, the bracket may be a two-piece bracket in which one portion comprises one of the pair of opposing uprights, and a second end portion comprises the other of the pair of opposing uprights. The bracket may be separable into its two pieces in the field without using tools In a further aspect of the inventive method, there is provided a method for replacing a tow rope on a tow reel, by:
 a) providing a tow reel assembly for an off-road vehicle, the assembly comprising:
  i) a bracket having a pair of opposing uprights and mountable to an off-road vehicle;
  ii) a reel adapted to be held by the bracket when mounted to the vehicle and effective for holding a tow rope, the reel including a shaft and a pair of opposing drum ends having a diameter greater than the diameter of the connecting shaft, and iii) a tow rope having an eye end and a free end, wherein the eye end is threaded around the shaft;

wherein the shaft has a first end and a second end, and wherein the first end of the shaft may be released from the first drum end and exposed to facilitate threading of the rope eye over the shaft without releasing the second end of the shaft from the second drum end;

b) releasing one end of the shaft from the drum end to which it is attached, thus exposing that end of the shaft;

c) removing the eye end of the tow rope from the shaft by sliding it off of the exposed end of the shaft;

d) replacing the removed tow rope on the shaft by sliding the eye of a new tow rope over the exposed end of the shaft; and e) returning the drum end to the shaft end from which the drum end was removed.

WRITTEN DESCRIPTION OF THE PREFERRED EMBODIMENTS

Figure 1:
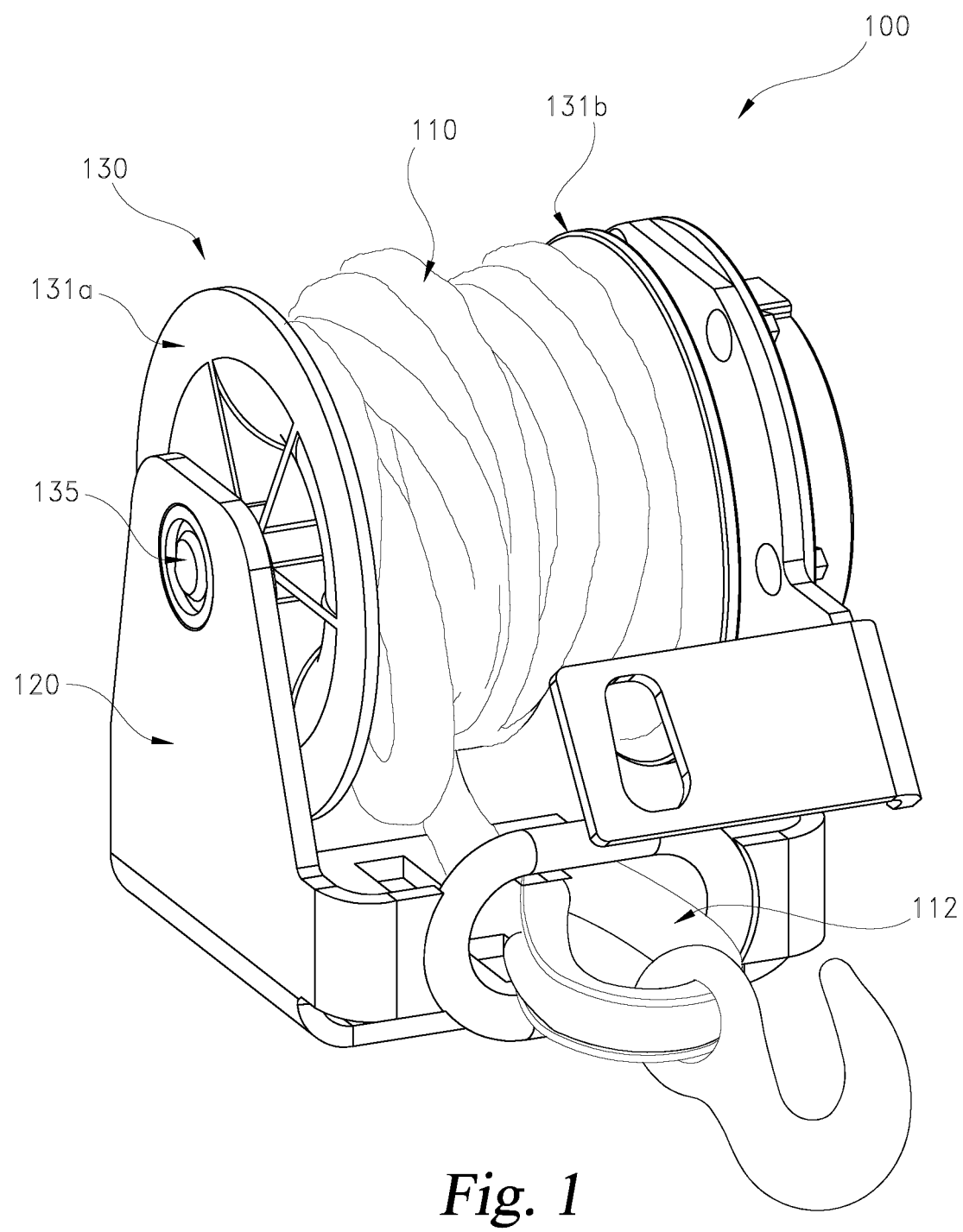
FIG. 1 shows a prior art tow reel.

For the purposes of promoting an understanding of the principles of the invention, reference will now be made to certain embodiments and specific language will be used to describe the same. It will nevertheless be understood that no limitation of the scope of the invention is thereby intended, with such alterations and modifications being contemplated as would normally occur to one skilled in the art to which the invention relates.

As previously indicated, one aspect of the present invention provides a tow reel assembly for an off-road vehicle. The assembly may comprise:

a) a bracket having a pair of opposing uprights and mountable to an off-road vehicle;

b) a reel adapted to be held by the bracket when mounted to the vehicle and effective for holding a tow rope, the reel including a shaft and a pair of opposing drum ends having a diameter greater than the diameter of the connecting shaft, wherein the shaft is quickly releasable from at least one of the drum ends in the field without using tools;

c) a tow rope having an eye end and a free end, wherein the eye end is threaded around the shaft.

In one embodiment the tow reel assembly uses a shaft with a first end and a second end, and the reel is a two-piece reel comprising a first reel portion and a second reel portion. The first reel portion may comprise a first drum end and a first shaft collar adapted to directly or indirectly connect the first shaft end to the first drum end, and the second reel portion may comprise a second drum end and a second shaft collar adapted to directly or indirectly connect the second shaft end to the second drum end. The first shaft collar may comprise an extension tube extending from the first drum end and adapted to receive the first shaft end.

The assembly may include a winding bar to facilitate winding of the rope around the shaft.

The assembly may be a retractable tow reel assembly, and may include a spring assembly to facilitate winding of the rope around the shaft. The spring may be a torsion spring.

The bracket may be a two-piece bracket comprising one of the pair of opposing uprights and a second end portion comprising the other of the pair of opposing uprights, and may be separable into its two pieces in the field without using tools.

In another embodiment the tow reel assembly comprises a bracket having a pair of opposing uprights and mountable to an off-road vehicle, a reel adapted to be held by the bracket when mounted to the vehicle, and a tow rope having an eye end and a free end. The reel may include a shaft and a pair of opposing drum ends having a diameter greater than the diameter of the connecting shaft, and the tow rope eye may be threaded around the shaft. The first end of the shaft may be released from the first drum end and exposed to facilitate threading of the rope eye over the shaft without releasing the second end of the shaft from the second drum end.

In a further embodiment of the present invention there is provided a method for replacing a tow rope on a tow reel. The method may comprise:

a) providing a tow reel assembly for an off-road vehicle, the assembly comprising:

i) a bracket having a pair of opposing uprights and mountable to an off-road vehicle;

ii) a reel adapted to be held by the bracket when mounted to the vehicle and effective for holding a tow rope, the reel including a shaft and a pair of opposing drum ends having a diameter greater than the diameter of the connecting shaft, wherein the shaft is quickly releasable from at least one of the drum ends in the field without using tools; and iii) a tow rope having an eye end and a free end, wherein the eye end is threaded around the shaft;

b) releasing one end of the shaft from the drum end to which it is attached, thus exposing that end of the shaft;

c) removing the eye end of the tow rope from the shaft by sliding it off of the exposed end of the shaft;

d) replacing the removed tow rope on the shaft by sliding the eye of a new tow rope over the exposed end of the shaft; and e) returning the drum end to the shaft end from which the drum end was removed.

In another aspect of the inventive method the tow reel assembly uses a shaft with a first end and a second end, and the reel is a two-piece reel comprising a first reel portion and a second reel portion. The first reel portion may comprise a first drum end and a first shaft collar adapted to directly or indirectly connect the first shaft end to the first drum end; and the second reel portion may comprise a second drum end and a second shaft collar adapted to directly or indirectly connect the second shaft end to the second drum end. One or both of the shaft collars may comprise an extension tube extending from the first drum end and adapted to receive the first shaft end.

In a further aspect of the inventive method, the tow reel is a retractable tow reel that includes a spring assembly to facilitate winding of the rope around the shaft. In some preferred embodiments the spring is a torsion spring.

In other aspects of the inventive method, the bracket may be a two-piece bracket in which one portion comprises one of the pair of opposing uprights, and a second end portion comprises the other of the pair of opposing uprights. The bracket may be separable into its two pieces in the field without using tools In a further aspect of the inventive method, there is provided a method for replacing a tow rope on a tow reel, by:

a) providing a tow reel assembly for an off-road vehicle, the assembly comprising:
  i) a bracket having a pair of opposing uprights and mountable to an off-road vehicle;
  ii) a reel adapted to be held by the bracket when mounted to the vehicle and effective for holding a tow rope, the reel including a shaft and a pair of opposing drum ends having a diameter greater than the diameter of the connecting shaft, and
  iii) a tow rope having an eye end and a free end, wherein the eye end is threaded around the shaft;

wherein the shaft has a first end and a second end, and wherein the first end of the shaft may be released from the first drum end and exposed to facilitate threading of the rope eye over the shaft without releasing the second end of the shaft from the second drum end;

b) releasing one end of the shaft from the drum end to which it is attached, thus exposing that end of the shaft;

c) removing the eye end of the tow rope from the shaft by sliding it off of the exposed end of the shaft;

d) replacing the removed tow rope on the shaft by sliding the eye of a new tow rope over the exposed end of the shaft; and e) returning the drum end to the shaft end from which the drum end was removed.

Referring now to the drawings, FIG. 1 shows a prior art tow reel. To replace the rope, shaft 135 must be removed from bracket 120 by punching one end of the shaft until both ends of the shaft are free of the bracket. Then, the eye of the rope may be threaded over the shaft before the shaft is replaced in the bracket.

Figure 2:
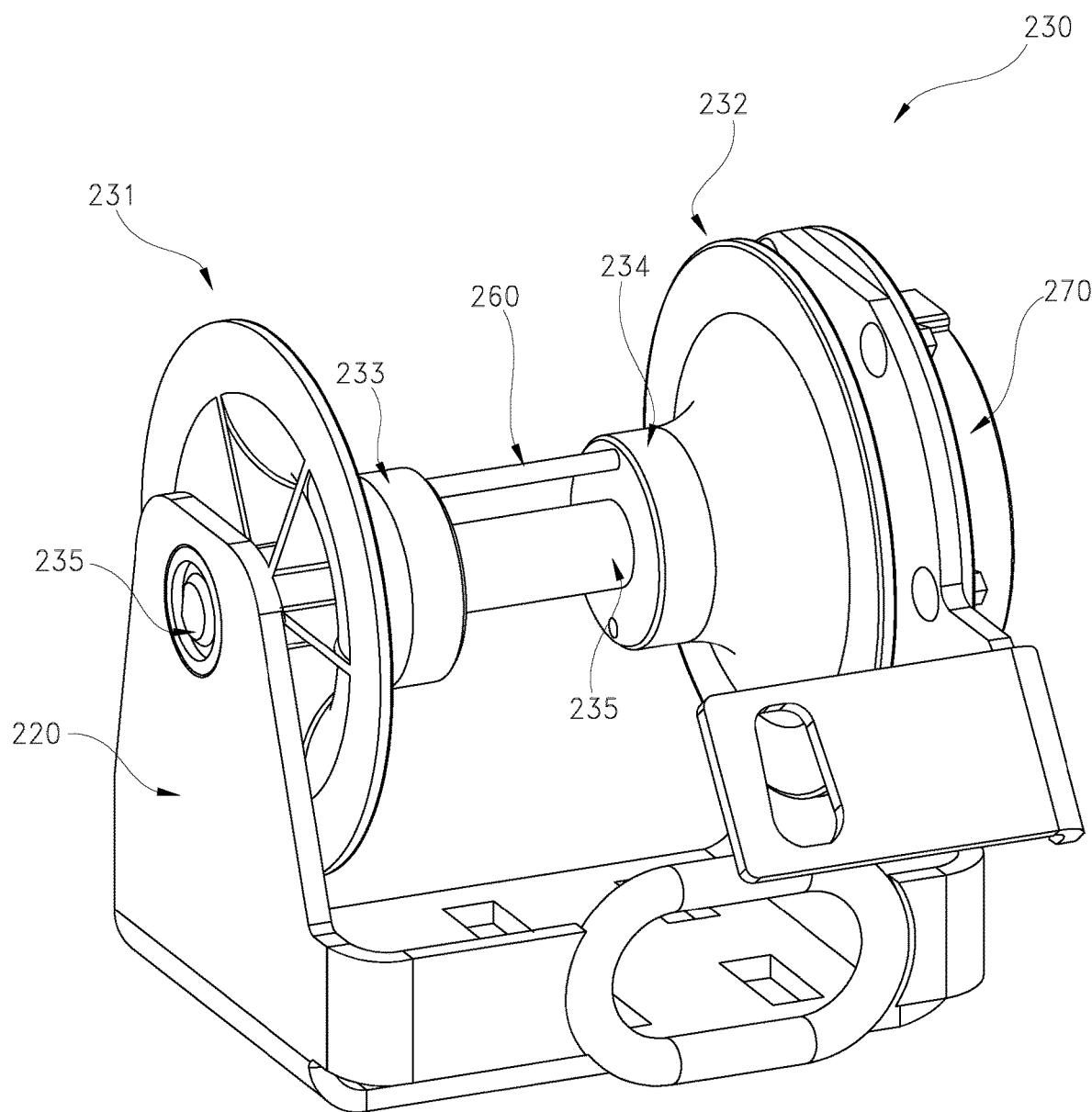
FIG. 2 shows the tow reel of the present invention, according to one embodiment.

FIG. 2 shows the tow reel of the present invention, according to one embodiment. The assembly includes bracket 220 comprising a pair of opposing uprights and mountable to an off-road vehicle. Bracket 220 holds drum 230, which includes a shaft 235 and a pair of opposing drum ends 231, 232. First end 231 and second end 232 each have a diameter greater than the diameter of connecting shaft 235. Each drum end includes a shaft collar 233, 234 adapted to directly or indirectly connect the shaft end to the end. Winding bar 260 is provided to facilitate winding of the rope around the shaft. Spring assembly 270 is provided to facilitate winding of the rope around the shaft.

Figure 3:
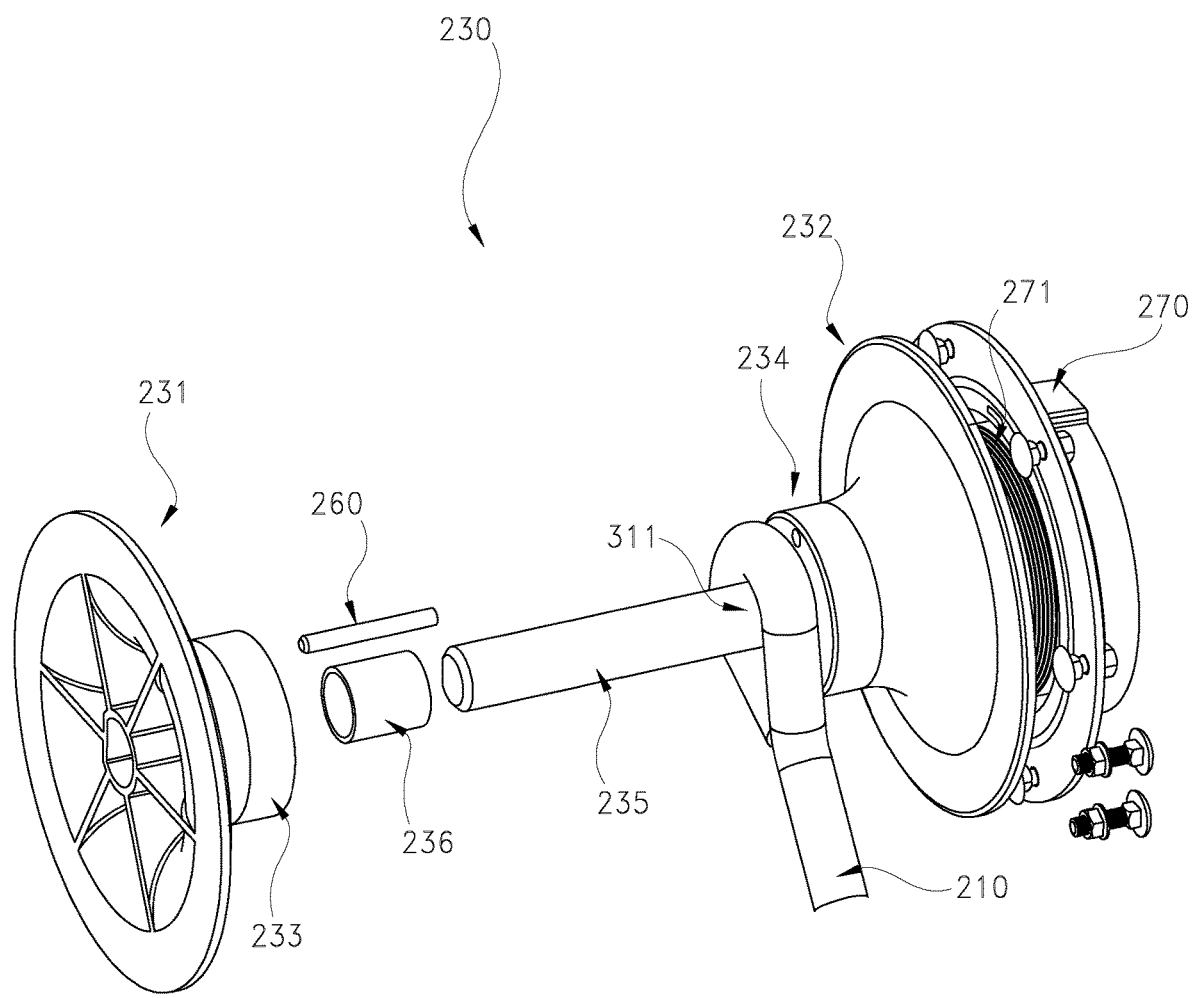
FIG. 3 shows an exploded view of the tow reel of FIG. 2.

FIG. 3 shows an exploded view of the tow reel 230 portion of FIG. 2, with a rope 210 attached. Shaft 235 is disposed between opposing drum ends 231 and 232, and, as stated above, first end 231 and second end 232 each have a diameter greater than the diameter of connecting shaft 235. Each drum end includes a shaft collar 233, 234 adapted to directly or indirectly connect the shaft end to the drum end, and an extension tube 236 extends from the first drum end and is adapted to receive the first shaft end. Winding bar 260 is provided to facilitate winding of the rope around the shaft. Spring assembly 270 is provided to facilitate winding of the rope around the shaft. Torsion spring 271 is used in the illustrated spring assembly 270.

Rope 210 is mounted on shaft 235 by threading the eye of the rope around shaft 235. This is preferably done when one of the drum ends 231 or 232 is removed from shaft 235, thus leaving an end of shaft 235 exposed and free to receive rope eye 311.

It can be seen from FIG. 3 that the present invention provides a superior method for replacing a tow rope on a tow reel. In one preferred embodiment the method comprises:

a) providing tow reel assembly, which comprises:
  i) a bracket 220 having a pair of opposing uprights and mountable to an off-road vehicle;
  ii) a reel 230 adapted to be held by the bracket when mounted to the vehicle and effective for holding a tow rope, the reel including a shaft 235 and a pair of opposing drum ends 231, 232 having a diameter greater than the diameter of the connecting shaft, wherein the shaft is quickly releasable from at least one of the drum ends in the field without using tools; and
  iii) a tow rope 210 having an eye end 311 and a free end, wherein the eye end is threadable around the shaft;

b) releasing one end of the shaft from the drum end to which it is attached, thus exposing that end of the shaft;

c) removing the eye end of the tow rope from the shaft by sliding it off of the exposed end of the shaft;

d) replacing the removed tow rope on the shaft by sliding the eye of a new tow rope over the exposed end of the shaft; and e) returning the drum end to the shaft end from which the drum end was removed.

It is to be appreciated that the inventive method is facilitated even further when the reel is a two-piece reel comprising a first reel portion and a second reel portion; wherein the first reel portion comprises a first drum end and a first shaft collar adapted to directly or indirectly connect the first shaft end to the first drum end; and wherein the second reel portion comprises a second drum end and a second shaft collar adapted to directly or indirectly connect the second shaft end to the second drum end; and wherein the first shaft collar comprises an extension tube extending from the first drum end and adapted to receive the first shaft end.

It is to be appreciated that the inventive method is facilitated even further when the bracket is separable into its two pieces in the field without using tools. In this embodiment, the bracket may be separated into its separate pieces as part of the process in which one end of the shaft is released from the drum end to which it is attached, thus exposing that end of the shaft.

Figure 4:
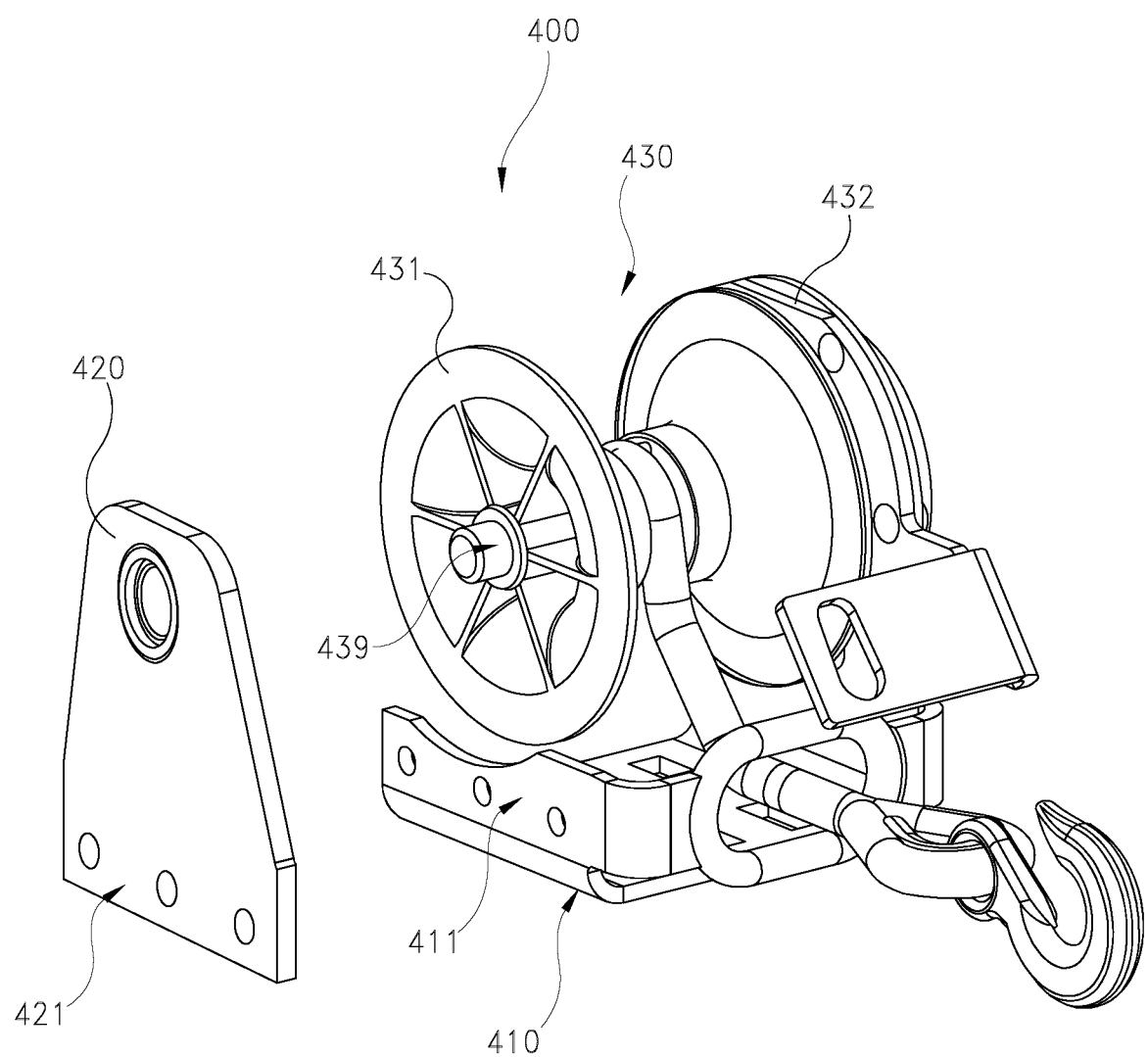
FIG. 4 shows an embodiment of the inventive tow reel in which the mounting bracket has a removable end piece.

FIG. 4 shows one embodiment in which the bracket has a removable end piece so that the bracket is readily separable into its two pieces in the field. Assembly 400 includes first bracket member 410 and second bracket member 420. Reel 430 is held by the two bracket members when they are connected together, but when they are disconnected from each other it is easier to remove a first end 431 from reel 430.

While the invention has been illustrated and described in the drawings and foregoing description, the same is to be considered as illustrative and not restrictive in character, it being understood that only certain preferred embodiments have been shown and described and that all changes and modifications that come within the spirit of the invention are desired to be protected. It is also to be appreciated that the present invention may comprise or consist essentially of any or all of the illustrated or described features, elements, and/or embodiments, and that any or all of the features, elements, and/or embodiments disclosed herein may be combined with any or all of the other features, elements, and/or embodiments disclosed herein to provide a system or method that comprises or consists essentially of such features, elements, and/or embodiments.

Further, the phrase A "and/or" B is used in this disclosure to mean A alone, or B alone, or both A and B.

The invention claimed is:

1. A retractable tow reel assembly for an off-road vehicle, the assembly comprising:

a) a bracket having a pair of opposing uprights and mountable to an off-road vehicle;
b) a reel adapted to be held by the bracket when mounted to the vehicle and effective for holding a tow rope, the reel including a shaft and a pair of opposing drum ends having a diameter greater than the diameter of the connecting shaft, wherein the shaft is quickly releasable from one of the drum ends without releasing the shaft from the other drum end;
c) the tow rope having an eye end and a free end, wherein the eye end is threaded around the shaft, wherein the shaft has a first end and a second end, and the reel is a two-piece reel comprising a first reel portion and a second reel portion,
wherein the first reel portion comprises a first drum end and a first shaft collar adapted to directly or indirectly connect the first shaft end to the first drum end, wherein the second reel portion comprises a second drum end and a second shaft collar adapted to directly or indirectly connect the second shaft end to the second drum end, and wherein the first shaft collar comprises an extension tube extending from the first drum end and adapted to receive the first shaft end.

2. The retractable tow reel assembly according to claim 1 and further including a winding bar to facilitate winding of the rope around the shaft.

3. The retractable tow reel assembly according to claim 1 and further including a spring assembly to facilitate winding of the rope around the shaft.

4. The retractable tow reel assembly according to claim 1 wherein the bracket is a two-piece bracket comprising a first end portion comprising one of the pair of opposing uprights, and a second end portion comprising the other of the pair of opposing uprights.

5. A retractable tow reel assembly for an off-road vehicle, the assembly comprising:
a) a bracket having a pair of opposing uprights and mountable to an off-road vehicle;
b) a reel adapted to be held by the bracket when mounted to the vehicle and effective for holding a tow rope, the reel including a shaft and a pair of opposing drum ends having a diameter greater than the diameter of the connecting shaft, wherein the shaft is quickly releasable from one of the drum ends without releasing the shaft from the other drum end;
c) the tow rope having an eye end and a free end, wherein the eye end is threaded around the shaft, wherein one of the pair of opposing uprights is separable from the other of the pair of opposing uprights and removable from the remainder of the assembly without removing the other upright from the assembly.

6. The retractable tow reel assembly according to claim 5 wherein one of the pair of opposing uprights is separable from the other of the pair of opposing uprights without removing the reel from the other of the pair of uprights.

7. The retractable tow reel assembly according to claim 5 and further including a winding bar to facilitate winding of the rope around the shaft.

8. The retractable tow reel assembly according to claim 5 and further including a spring assembly to facilitate winding of the rope around the shaft.

9. The retractable tow reel assembly according to claim 5 wherein the bracket is a two-piece bracket comprising a first end portion comprising one of the pair of opposing uprights, and a second end portion comprising the other of the pair of opposing uprights.

10. The retractable tow reel assembly according to claim 5 wherein the bracket is separable into its two pieces in the field without using tools.

11. A retractable tow reel assembly for an off-road vehicle, the assembly comprising:
a) a bracket having a pair of opposing uprights and mountable to an off-road vehicle;
b) a reel adapted to be held by the bracket when mounted to the vehicle and effective for holding a tow rope, the reel including a shaft and a pair of opposing first and second drum ends having a diameter greater than the diameter of the connecting shaft, and
c) the tow rope having an eye end and a free end, wherein the eye end is threaded around the shaft;
wherein the shaft has a first end and a second end, and wherein the first end of the shaft may be released from the first drum end and exposed to facilitate threading of the rope eye over the shaft without releasing the second end of the shaft from the second drum end.

12. A method for replacing a tow rope on a tow reel, the method comprising:
a) providing a tow reel assembly for an off-road vehicle, the assembly comprising:
i) a bracket having a pair of opposing uprights and mountable to an off-road vehicle;
ii) a reel adapted to be held by the bracket when mounted to the vehicle and effective for holding a tow rope, the reel including a shaft and a pair of opposing drum ends having a diameter greater than the diameter of the connecting shaft, wherein the shaft is quickly releasable from at least one of the drum ends without releasing the shaft from the other drum end; and
iii) a tow rope having an eye end and a free end, wherein the eye end is threaded around the shaft;
b) releasing one end of the shaft from the drum end to which it is attached, thus exposing that end of the shaft;
c) removing the eye end of the tow rope from the shaft by sliding it off of the exposed end of the shaft;
d) replacing the removed tow rope on the shaft by sliding the eye of a new tow rope over the exposed end of the shaft; and
e) returning the drum end to the shaft end from which the drum end was removed.

13. The method according to claim 12 wherein the shaft has a first end and a second end, and the reel is a two-piece reel comprising a first reel portion and a second reel portion,
wherein the first reel portion comprises a first drum end and a first shaft collar adapted to directly or indirectly connect the first shaft end to the first drum end; and wherein the second reel portion comprises a second drum end and a second shaft collar adapted to directly or indirectly connect the second shaft end to the second drum end.

14. The method according to claim 13 wherein the first shaft collar comprises an extension tube extending from the first drum end and adapted to receive the first shaft end.

15. The method according to claim 12 wherein the tow reel is a retractable tow reel that includes a spring assembly to facilitate winding of the rope around the shaft.

16. The method according to claim 12 wherein the bracket is a two-piece bracket comprising a first end portion comprising one of the pair of opposing uprights, and a second end portion comprising the other of the pair of opposing uprights.

17. The method according to claim 16 wherein the bracket is separable into its two pieces in the field without using tools.

18. The method according to claim 12 wherein the shaft is quickly releasable from at least one of the drum ends in the field without using tools.

19. The method according to claim 12 wherein the bracket is separable into its two pieces in the field without using tools.

20. A method for replacing a tow rope on a tow reel, the method comprising:
   a) providing a tow reel assembly for an off-road vehicle, the assembly comprising:
      i) a bracket having a pair of opposing uprights and mountable to an off-road vehicle;
      ii) a reel adapted to be held by the bracket when mounted to the vehicle and effective for holding a tow rope, the reel including a shaft and a pair of opposing drum ends having a diameter greater than the diameter of the connecting shaft, wherein the shaft is quickly releasable from one of the drum ends without releasing the shaft from the other drum end, and
      iii) the tow rope having an eye end and a free end, wherein the eye end is threaded around the shaft;
   wherein the shaft has a first end and a second end, and wherein the first end of the shaft may be released from the first drum end and exposed to facilitate threading of the rope eye over the shaft without releasing the second end of the shaft from the second drum end;
   b) releasing one end of the shaft from the drum end to which it is attached, thus exposing that end of the shaft;
   c) removing the eye end of the tow rope from the shaft by sliding it off of the exposed end of the shaft;
   d) replacing the removed tow rope on the shaft by sliding the eye of a new tow rope over the exposed end of the shaft; and
   e) returning the drum end to the shaft end from which the drum end was removed.

* * * * *